United States Patent [19]
Maase et al.

[11] Patent Number: 5,748,766
[45] Date of Patent: May 5, 1998

[54] METHOD AND DEVICE FOR REDUCING SMEAR IN A ROLLED FINGERPRINT IMAGE

[75] Inventors: Daniel Frederick Maase, Campbell; Thomas Frank Sartor, Sunnyvale, both of Calif.

[73] Assignee: Identix Incorporated, Sunnyvale, Calif.

[21] Appl. No.: 640,006

[22] Filed: Apr. 30, 1996

[51] Int. Cl.[6] ............................ G06K 9/00; G06K 9/20
[52] U.S. Cl. ........................... 382/124; 382/127; 356/71
[58] Field of Search ............................... 382/124–127, 382/312; 356/71

[56] References Cited

U.S. PATENT DOCUMENTS

| | | | |
|---|---|---|---|
| 3,174,414 | 3/1965 | Myer | 95/1.1 |
| 3,482,498 | 12/1969 | Becker | 95/12 |
| 3,527,535 | 9/1970 | Monroe | 356/71 |
| 3,619,060 | 11/1971 | Johnson | 356/71 |
| 3,702,731 | 11/1972 | Wood, Jr. | 335/18 |
| 3,947,128 | 3/1976 | Weinberger et al. | 356/71 |
| 3,975,711 | 8/1976 | McMahon | 340/146.3 E |
| 4,120,585 | 10/1978 | DePalma et al. | 356/71 |
| 4,151,512 | 4/1979 | Riganati et al. | 340/146.3 E |
| 4,537,484 | 8/1985 | Fowler et al. | 354/62 |
| 4,553,837 | 11/1985 | Marcus | 356/71 |
| 4,681,435 | 7/1987 | Kubota et al. | 356/71 |
| 4,792,226 | 12/1988 | Fishbine et al. | 356/71 |
| 4,933,976 | 6/1990 | Fishbine et al. | 382/4 |
| 5,067,162 | 11/1991 | Driscoll, Jr. et al. | 382/5 |
| 5,230,025 | 7/1993 | Fishbine et al. | 382/127 |
| 5,416,573 | 5/1995 | Sartor, Jr. | 356/71 |
| 5,548,394 | 8/1996 | Giles et al. | 356/71 |

FOREIGN PATENT DOCUMENTS

| | | |
|---|---|---|
| 3421220 A1 | 12/1985 | Germany . |
| 3423886 A1 | 1/1986 | Germany . |

*Primary Examiner*—Leo Boudreau
*Assistant Examiner*—Bhavesh Mehta
*Attorney, Agent, or Firm*—Fish & Richardson P.C.

[57] ABSTRACT

A fingerprint image capture system reduces tip smear by ceasing to update a data array characteristic of the rolled fingerprint image behind an advancing freeze column at least about half way from the trailing edge to the leading edge of a finger contact strip.

22 Claims, 7 Drawing Sheets

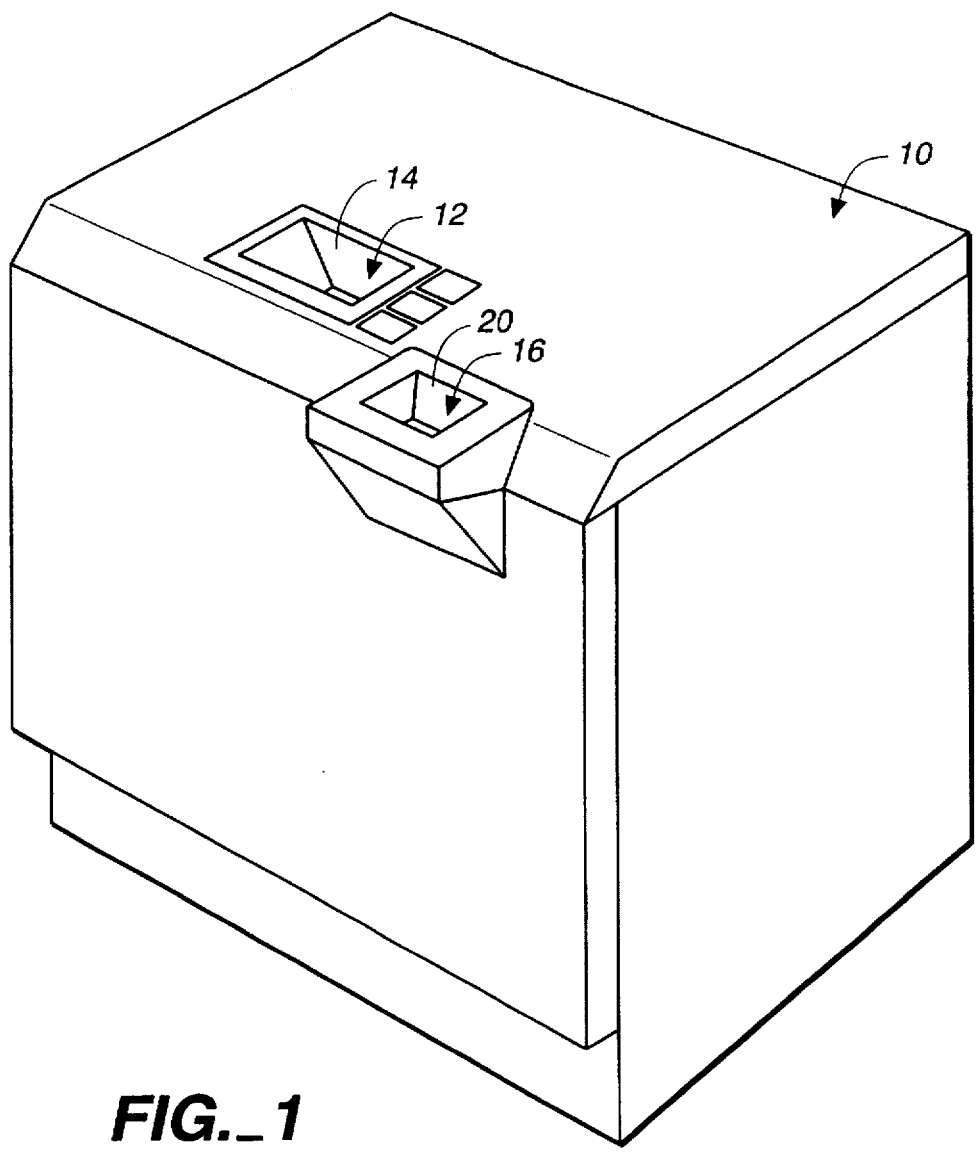
FIG._1

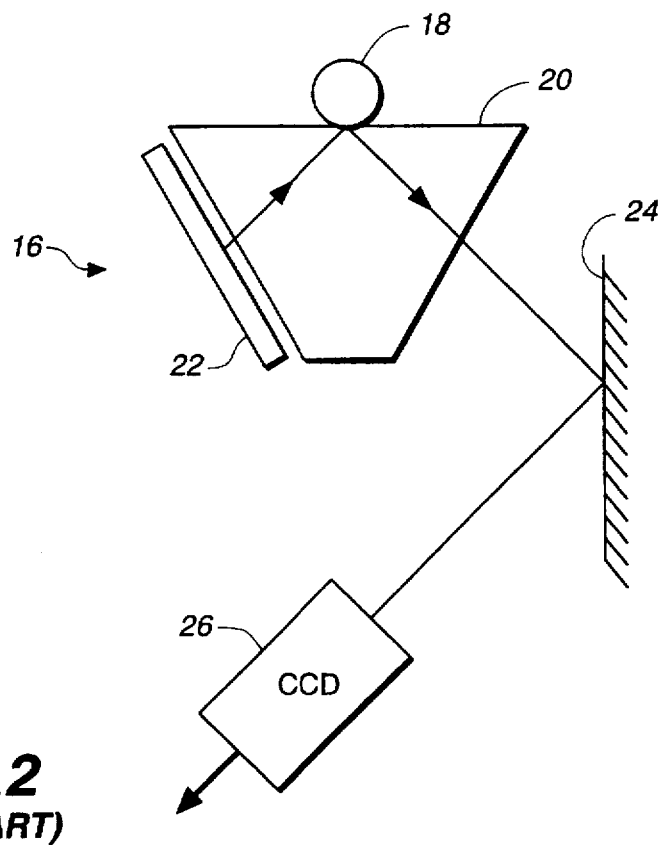
FIG._2
*(PRIOR ART)*
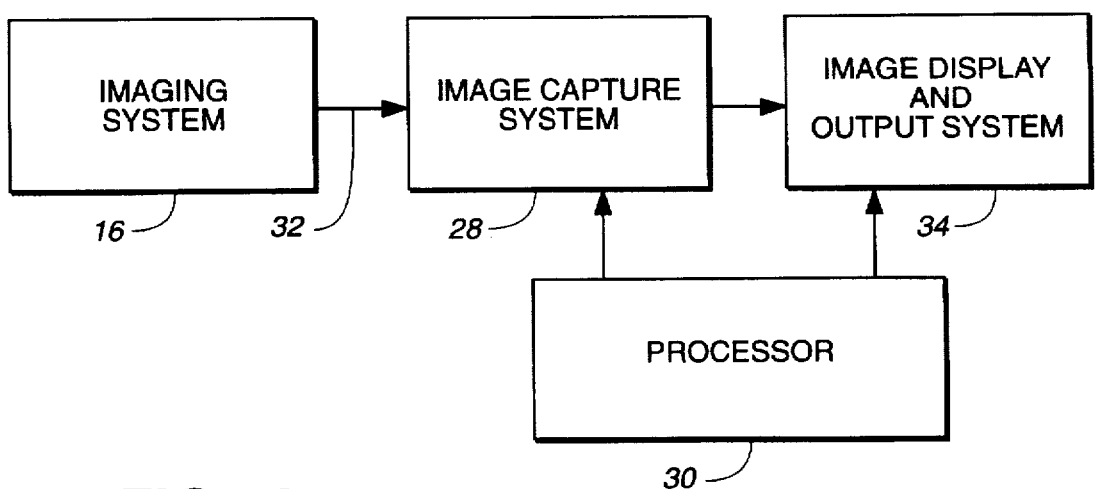
FIG._3

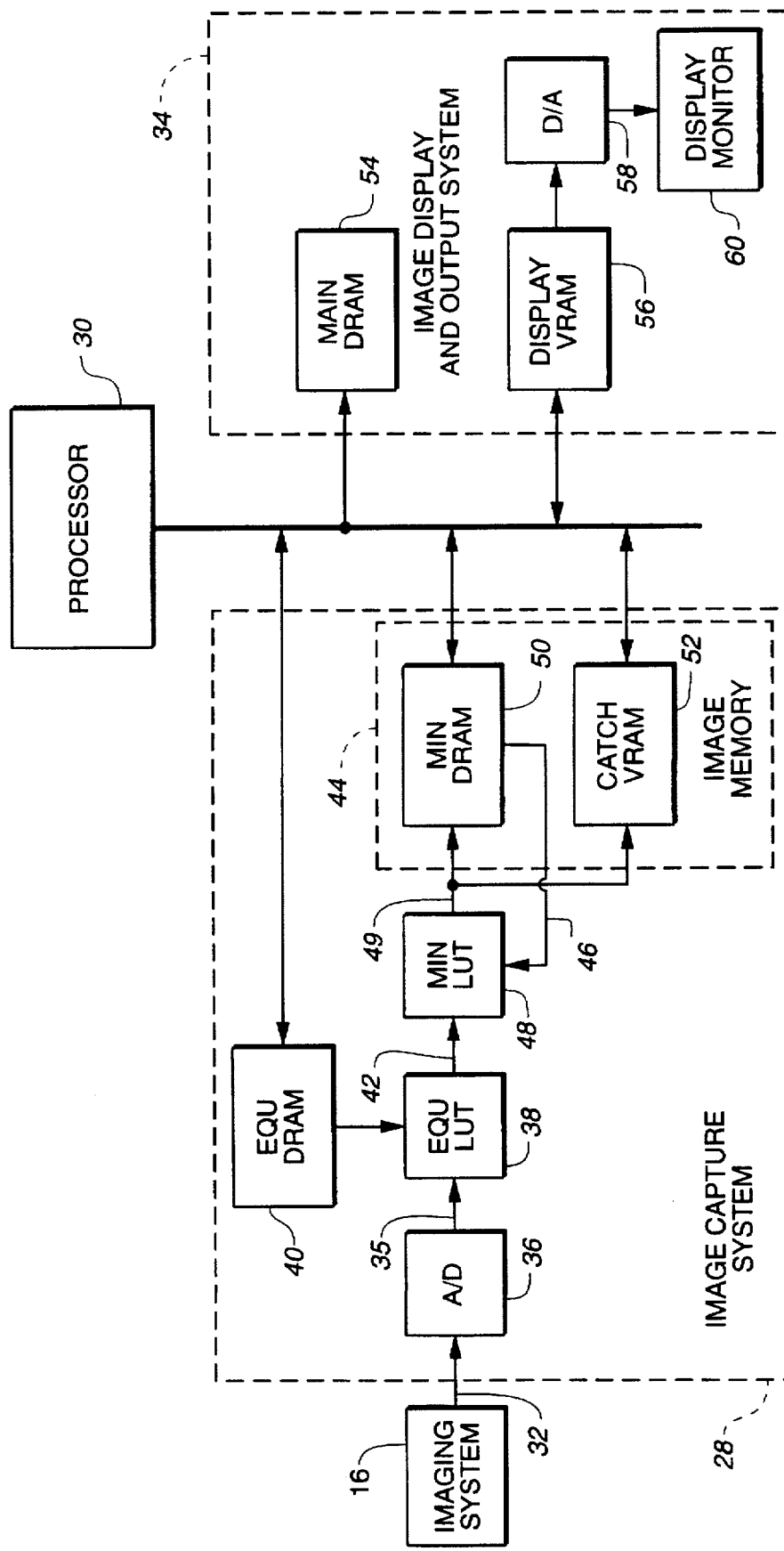
FIG._4

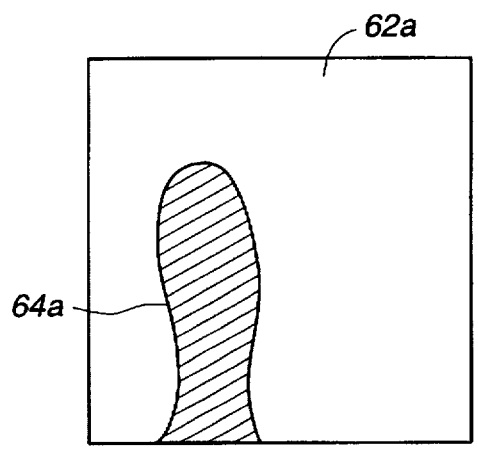
FIG._5A
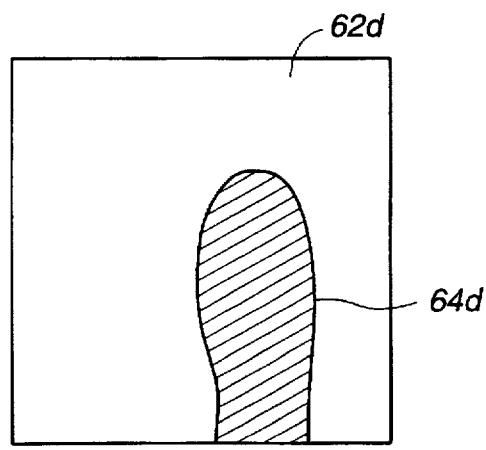
FIG._5D
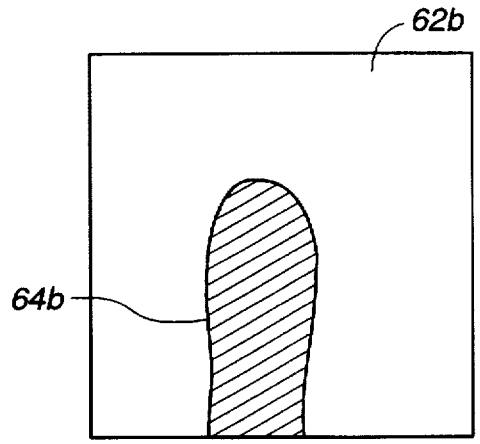
FIG._5B
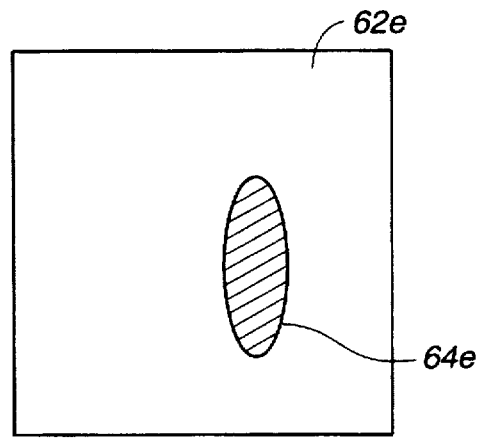
FIG._5E
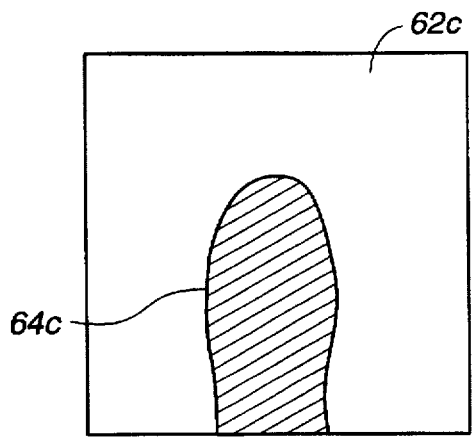
FIG._5C

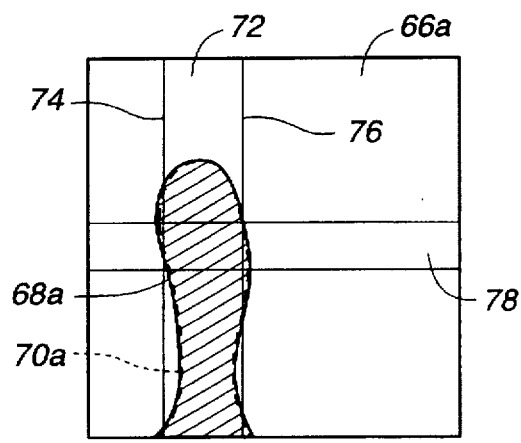
FIG._6A
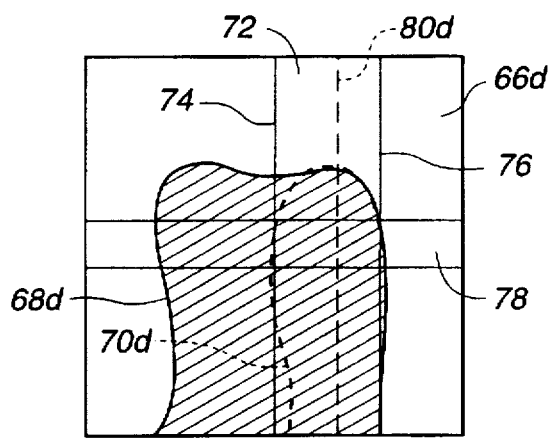
FIG._6D
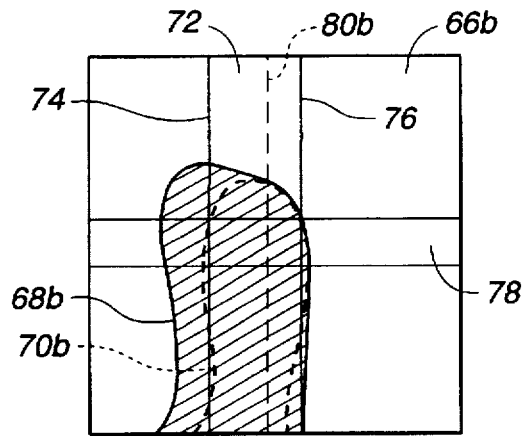
FIG._6B
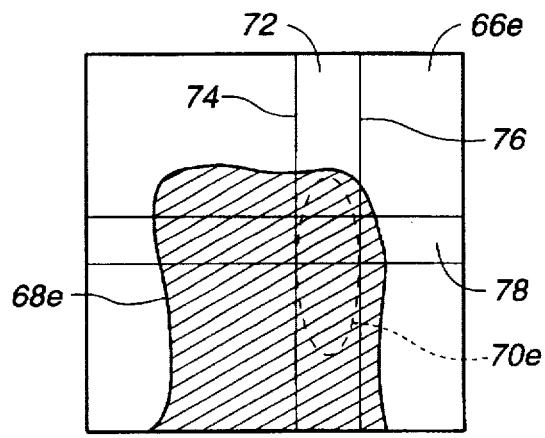
FIG._6E
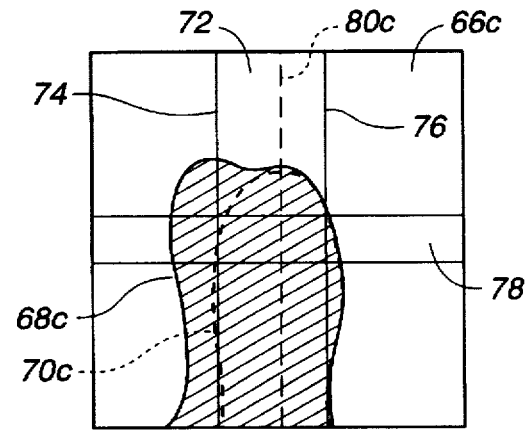
FIG._6C

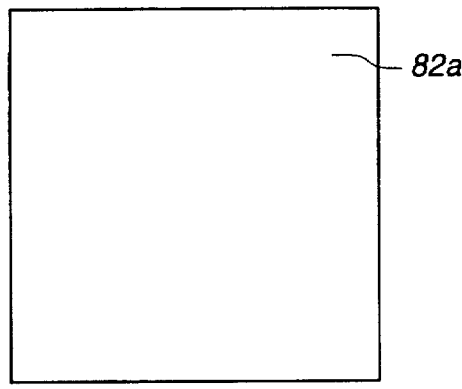
FIG._7A
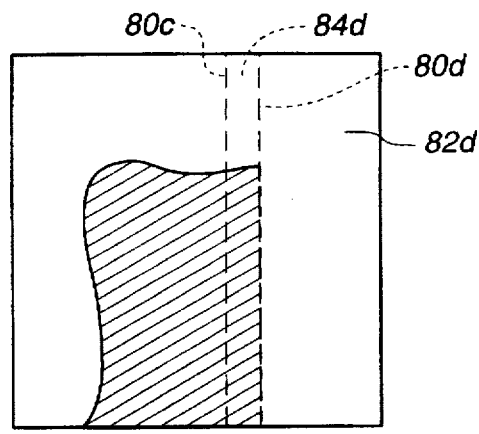
FIG._7D
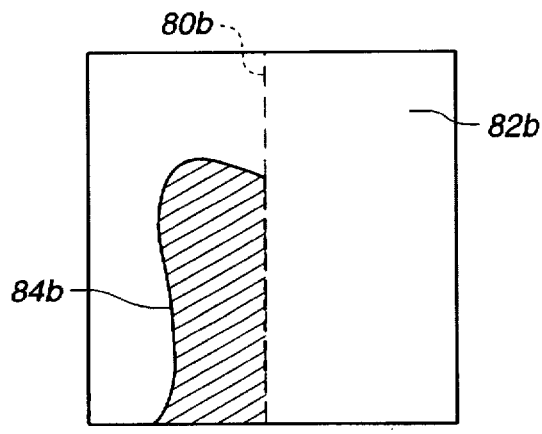
FIG._7B
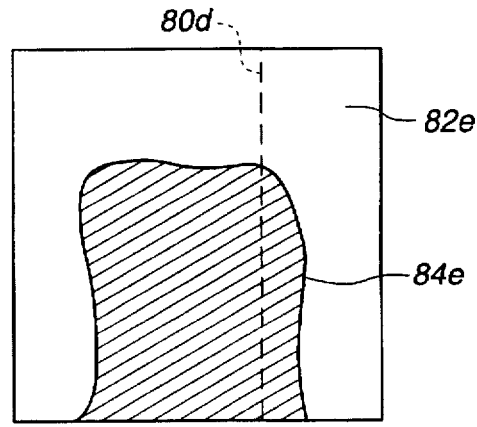
FIG._7E
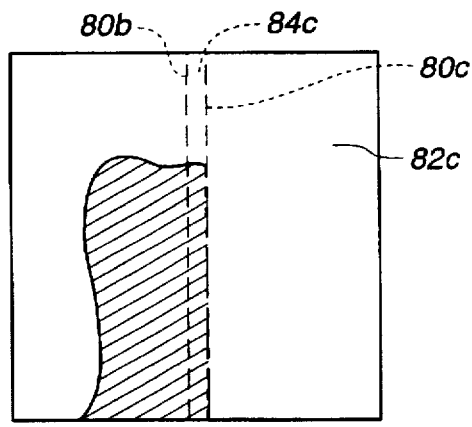
FIG._7C

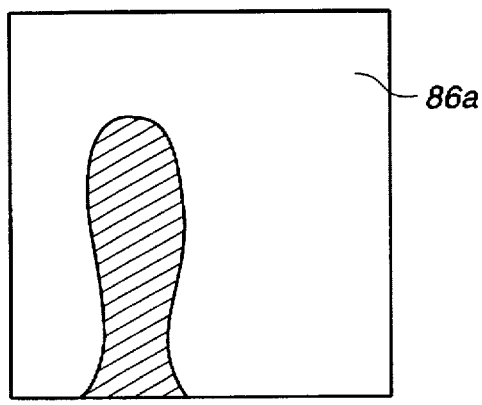
FIG._8A
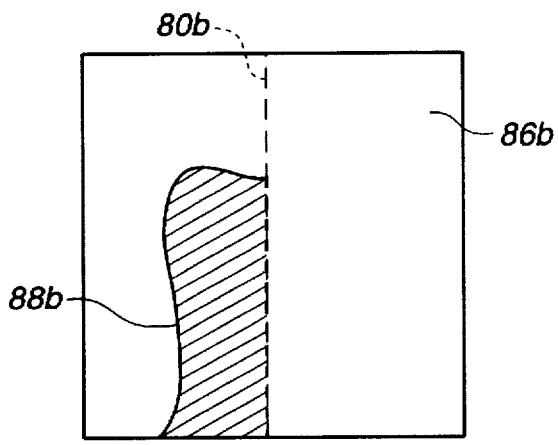
FIG._8B
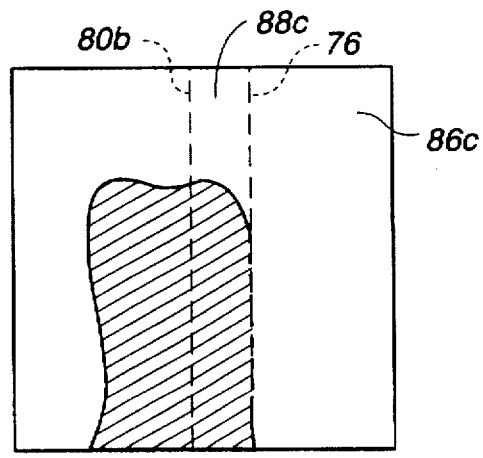
FIG._8C
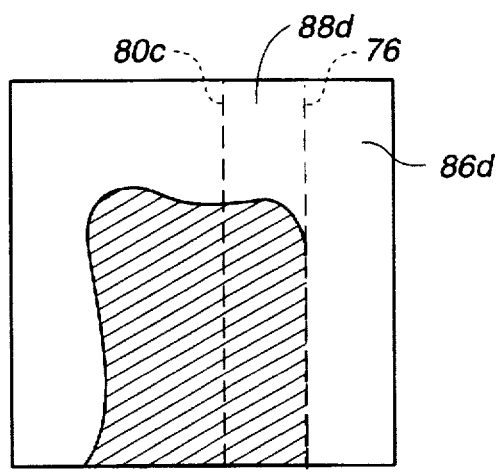
FIG._8D
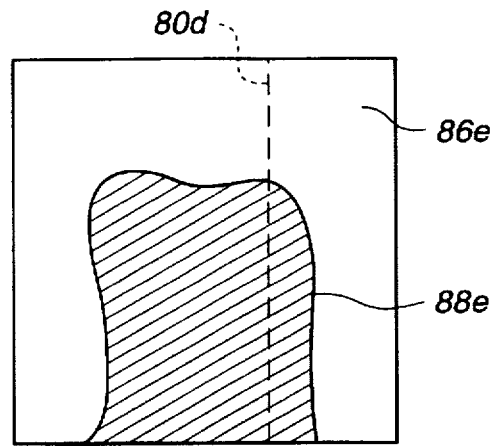
FIG._8E

METHOD AND DEVICE FOR REDUCING SMEAR IN A ROLLED FINGERPRINT IMAGE

REFERENCE TO MICROFICHE APPENDIX

A microfiche appendix containing C language source code for software for operating an Identix TP-600 fingerprint capture device, consisting of 55 microfiche images on 1 microfiche card is filed herewith. A portion of the disclosure of the patent document contains material subject to copyright protection. The copyright owners have no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The invention relates to electronic fingerprint image capture systems, and, in particular, to a method of reducing smearing in a captured rolled fingerprint image.

The traditional method of obtaining a fingerprint image is to first apply ink to a subject's finger, and then to transfer the fingerprint pattern of ridges and valleys to a piece of paper by pressing the finger to the paper. The fingerprint pattern of ridges transfers to the paper, while the valleys do not. To obtain a rolled fingerprint image, a side of an inked finger is placed in a designated area of the paper and then the finger is rolled to its other side on the paper.

Opto-electronic systems can capture a rolled fingerprint image without the use of ink. Typically, a series of optical images of a rolling finger on an imaging surface are propagated from an imaging device and converted to digital data. A variety of methods can be used to generate a rolled fingerprint image from the digital data representative of the series of images. One method is disclosed in U.S. Pat. No. 4,933,976. According to this method, the propagated images are sequentially stored in the form of digital arrays of image data. Active areas of the arrays representative of fingerprint features are identified as a mathematical function of the stored image data. If adjacent two-dimensional active areas have sufficient overlap, then they are merged according to a mathematical function of the data in the overlap region to form a composite array characteristic of the rolled fingerprint image. The mathematical function in the composite array generating step is an average, a comparison or an average and a comparison of the overlapping data in adjacent active areas.

Another method is used in the model TP-600 system, produced by Identix, Inc. of Sunnyvale, Calif. The TP-600 includes an optical system having a large charge coupled device (CCD) imager that accommodates the entire imaging surface of an optical platen. The CCD output is an analog signal characteristic of light and dark patterns on the imaging surface. When a finger is placed on the platen, the analog signal has lower values (darker) for fingerprint ridge information and higher values (lighter) for fingerprint valley information, similar to what occurs when ink is used for fingerprinting. The analog signal is applied to an analog-to-digital (A/D) converter, the output of which is digital image data used to update the content of an array in image memory by means of a minimum function. Each element in the array initially has a value that represents the light intensity imaged at a corresponding location on the platen. As the finger is rolled across the imaging surface of the platen, the data in the image memory is developed and updated.

The minimum function operates by preserving pixel values in image memory that are lower than the corresponding values of the incoming image data. If the value of the current image data is lower than the corresponding pixel value in image memory, then the lower image data value displaces the higher value in the array. Thus, for every location where a finger ridge contacts the imaging surface a lower pixel value (darker) is preserved in image memory. The contents of image memory are output to peripheral devices for storing a captured rolled fingerprint image and for real-time display of the developing rolled fingerprint image.

While using the minimum function method of acquiring a rolled print by saving the darkest intensity value will produce a good quality print, free of recognizable artifacts, and will be insensitive to the speed with which the finger is rolled, some areas of the print tend to have a smeared characteristic, reducing the differentiation between ridges and valleys. This effect occurs where the finger slides on the imaging surface while still in contact. The smearing often occurs at the tip of the finger and at the edge of the contacting area. The use of tacky coatings on the contact surface reduces overall slippage, but the rounded geometry of the finger makes tip smear a continuing problem. While smearing is found in inked prints as well as those obtained by the opto-electronic system, it would be advantageous for the opto-electronic systems to improve the clarity of the image in the areas in which slip occurs.

SUMMARY OF THE INVENTION

The invention provides a method of reducing smear in a rolled fingerprint image represented by a rolled image array. The method includes the step of generating a series of frames of an optical image signal, wherein the optical image signal includes data characteristic of light intensities of corresponding locations of an optical image, wherein the optical image includes a fingerprint image of a finger rolling on a surface. The method also includes determining, for each frame of the optical image signal, a freeze column representing a line positioned between leading and trailing edges of the fingerprint image and oriented transverse to a direction of roll of the finger. The method further includes sequentially updating an interim array that is an accumulation of the frames of the optical image signal and characteristic of an interim image of a rolled fingerprint. A current update of the interim array is formed by reducing pixel values of the interim array with a portion of the difference between the corresponding data values from the current frame of the optical image signal and the pixel values of the interim array only if the corresponding data values of the current frame of the optical image signal are less (characteristic of darker features) than the corresponding pixel values of the interim array. The rolled image array is generated by transferring portions of the interim array to the rolled image array in concert with the movement of the finger image in the optical input signal.

During each update cycle, a new freeze column is determined at a position near a midpoint of a finger contact area which in turn is determined from the leading and trailing edges of the fingerprint image associated with a current frame of the optical image signal. The rolled image array may be initialized with a trailing portion of a current interim array, the trailing portion being interim array data behind a current freeze column in a direction of finger roll. Each time a new freeze column is determined by a processor in the system, current interim array data between the current freeze column and the previous freeze column is transferred to the rolled fingerprint image array. Alternatively, current interim array data between the previous freeze column and data characteristic of the leading edge of the rolled fingerprint in the interim image is transferred to the rolled fingerprint image array each time a new freeze column is determined. In both cases, the trailing portion of the interim array behind the previous freeze column is not used to further update the rolled image array. Thus, the data in the rolled image array is frozen behind a freeze column that moves in the direction of finger roll and smearing in the rolled fingerprint image due to finger movement behind that column is eliminated.

In addition to eliminating smear in the rolled fingerprint image behind the freeze column, the invention preserves the benefits provided by the minimum function in merging a series of frames of the image data signal.

BRIEF DESCRIPTION OF THE DRAWING

The accompanying drawings, which are incorporated and constitute a part of the specification, schematically illustrate an embodiment of the invention and, together with the general description given above and the detailed description of the embodiments given below, serve to explain the principles of the invention.

FIG. 1 is a perspective view of an image capture device.

FIG. 2 is a diagrammatic illustration of the prior art rolled fingerprint optical imaging system of the image capture device illustrated in FIG. 1.

FIG. 3 is a functional block diagram of the image capture device of FIG. 1.

FIG. 4 is a functional block diagram of a portion of the image capture device of FIG. 1.

FIGS. 5A–E illustrate a series of optical images of a finger rolling on a platen.

FIGS. 6A–6E illustrate a series of images represented in the image memory shown in FIG. 3 by an interim data array. The images temporally correspond with the images illustrated in FIGS. 5A–5E, respectively.

FIGS. 7A–7E illustrate a series of images represented in output DRAM by a rolled fingerprint image array. The images temporally correspond with the images illustrated in FIGS. 6A–6E, respectively.

FIGS. 8A–8E illustrate a series of images represented in display VRAM by a rolled fingerprint image array. The images temporally correspond with the images illustrated in FIGS. 6A–6E, respectively.

DETAILED DESCRIPTION OF THE INVENTION

A smear reduction method for reducing the effects of smearing in rolled fingerprint images is provided. Referring to FIG. 1, the smear reduction method may be incorporated into the operation of a model TP-600 fingerprint capture device 10, manufactured by Identix, Inc., the assignee of the subject matter of this application.

The TP-600 includes separate imaging systems for obtaining a rolled fingerprint image and for obtaining a plain, or slap image. The plain fingerprint imaging system 12 produces an analog signal representing the image of one or more fingers pressed to a plain print platen 14, and a rolled fingerprint imaging system 16 that produces an analog signal representing the image of a finger 18 being rolled across a rolled print platen 20. Referring now also to FIG. 2, each imaging system includes an illumination source 22, optics 24, and a large CCD imaging device 26 that accommodates the entire image from the platen surface. In the described embodiment, the CCD imaging device 26 for the rolled fingerprint image is a model TC217 CCD imaging array, available from Texas Instruments, Inc. of Dallas, Tex. Although only one mirror is shown in FIG. 2, optics 24 actually includes a combination of prisms, mirrors, and lenses selected and arranged to bring the image from the platen surface to the CCD imaging device 26. The plain print platen 14 is wider than the rolled print platen 20 to accommodate four fingers rather than one finger on its surface, and its optics 24 are arranged differently to accommodate the larger imaging surface. The purpose of each system is to present a fingerprint image at the surface of a CCD imaging device when a finger is applied to the imaging surface of the platen.

Referring now to FIG. 3, the output of the CCD imaging device 26 is an analog signal 32 which is applied to an image capture system 28. The illumination and imaging, and the CCD output convention employed present an image signal that has lower values (darker) for ridge information and higher values (lighter) for valley information.

A processor 30 is used to manage the transport of data between and through each functional element of the system and to perform other "housekeeping" functions such as writing text to an image display monitor 60 in the image display and output system 34, intercepting switch closures and performing system start-up and shut-down operations. As will be described in greater detail below, the processor 30 also actively manages the processing of image data as the finger is rolled on the platen surface in forming a rolled fingerprint image. For the described embodiment, a graphic processor manufactured by Texas Instruments, Inc., part number TMS34020, is used. This particular processor supports special functions for processing two-dimensional arrays in memory. A copy of the source code in C language for operating the TP-600 is included in the microfiche appendix.

Referring now also to FIG. 4, the analog signal 32 from the CCD imaging device 26 of the imaging system 16 is applied to an analog-to-digital (A/D) converter 36 that is part of image capture system 28. Because the illumination of the fingerprint is not uniform in the scanner, the data values of the A/D output digital data 35 are individually scaled by an equalization look-up table (Equ LUT) 38 according to table values stored in the equalization memory (Equ DRAM) 40. The stored reference values correspond to an image of the surface of a blank platen 20, smoothed to eliminate noise and surface contamination.

The output from Equ LUT 38 is an optical image signal 42 in the form of a stream of digital data that can be grouped in frames. The data have values which are characteristic of the light intensity of corresponding locations of the imaging surface of the platen 20. Each frame corresponds to an image of the platen at a different time. The data values are updated about fifteen times a second. Thus, about 25–35 frames of optical image signal 42 are generated during the time it takes for the finger 18 to roll across the surface of the platen 20.

The optical image signal 42 is used to update the content of an image memory 44, which holds a 968×968 pixel interim data array, by means of a functional element identified as a "minimum function" look-up table (Min LUT) 48. This size array is sufficient to produce an image with a resolution of 600 dots per inch. The inputs to Min LUT 48 are the A/D converter output 35 as modified by Equ LUT 38, which is the current optical image signal 42, and the corresponding old interim data array pixel values 46 which are to be updated. The "latest value" is input from the current frame of optical image signal 42 and the "old value" is input from the current interim data array, as most recently updated by the previous frame of optical image signal 42.

In the simplest implementation, the Min LUT 48 computes $F^n_{i,j}$, the new pixel value 49 of the interim data array at row i and column j, as a minimum, $F^n_{i,j} = \min(I^n_{i,j}, F^{n-1}_{i,j})$, where $I^n$ is the input datum value of the nth frame from the Equ LUT 38 and $F^{n-1}_{i,j}$ is the feedback 46 from the image memory 44 from the preceding frame. The output signal 49 of Min LUT 48, for each pixel of interim data array, is the lower value of its two inputs, as suggested by its name. For each datum output by the A/D converter 36 (as modified by Equ LUT 38 to form optical image signal 42), the corresponding pixel of interim data array in the image memory 44 is updated.

It is not necessary to store the digital data 35 output from A/D converter 36 and the optical image signal 42 from Equ LUT 38 as arrays before being processed by Min LUT 48. The values of output data 49 from Min LUT 48 used to update the interim data array depend only on the corresponding datum values of the optical image signal 42 and on the old corresponding pixel values 46 of interim data array. For every location where a finger ridge contacts the imaging surface of the platen 20, a lower pixel value (darker) is preserved. The result of this technique is that as the finger 18 is rolled across the imaging surface of platen 20, an interim rolled fingerprint image is constructed in image memory 44. This process has been found to eliminate artifacts such as fingerprint features or discontinuities that are not part of the true fingerprint.

When performing a capture of a rolled fingerprint image, the interim data array in image memory 44 must be initialized since feedback is involved. One way to initialize image memory 44 is to set all the pixel values to a maximum value. Then the interim data array in image memory 44 will immediately reflect any data that is input in the next frame. In another embodiment, interim data array can be initialized by setting up Min LUT 48 as a straight-through function such that its output is the same as the optical image signal 42 input from the Equ LUT 38. The first frame of optical image signal 42 can then update the image memory 44 independently of what is already stored.

As the finger 18 is rolled, the edges of the contact area of the finger on the platen may move fairly rapidly with respect to the frame update rate. This may cause some discontinuities to occur between the interlaced fields of the video. Similarly, the tip of the finger often slides as it contacts the platen, causing discontinuities. To resolve this problem, the function loaded into the Min LUT 48 can be modified from a strict minimum such that when the input datum value $I^n$ is less than the previous interim array value $F^{n-1}$, the interim array value is reduced by a portion of the difference, $F^n = F^{n-1} - K*(F^{n-1} - I^n)$, where K is a factor less than or equal to one that sets how fast the value in a pixel may change. Noticeable improvement in the image quality can be obtained with K in a range of 0.25 to 0.5. For the described embodiment, K is set to approximately 0.33. This function causes the conditions of concern to appear as gray smears instead of jagged discontinuities, since the conditions are often only present for a small number of frames.

The Min LUT 48 has a 64 Kb×8 SRAM and registers to pipeline the input and output. A 64 Kb address space requires 16 address lines. The two 8-bit inputs to the Min LUT 48 are tied to 8 address lines each. Thus, for each set of the two input values there is one corresponding location in the SRAM which contains the desired value to be output. This implementation is very unrestrictive, since any function can be implemented in a tabular form. The different functions to be used in the Min LUT 48 are typically precomputed and stored in a Main DRAM 54 and then loaded into the SRAM when needed.

Image memory 44 includes two redundant memories, Min DRAM 50 and Catch VRAM 52. They independently and simultaneously hold the same interim data array for transfer to image display and output system 34. Image display and output system 34 includes a main output memory 54 (located in Main DRAM) and a display memory 56 (located in Display VRAM) that receive data transferred by processor 30 from Min DRAM 50 and Catch VRAM 52, respectively. The display memory 56 is used to provide information to the operator in real-time. The display memory 56 receives image information along with fingerprint placement cursors and text information providing instructional information to the operator. The display memory 56 typically contains less information than that contained in image memory 44 or output memory 54 for reasons of data efficiency, display raster size, and other display limitations. The output memory 54 does not contain text information and finger placement cursor information. This memory contains all the high quality image data.

The interim data array in image memory 44 represents an interim rolled fingerprint image, and could be transferred in its entirety with each frame to output memory 54 or display memory 56 to form a rolled fingerprint image array. This is the method of the prior art TP-600. However, if the finger 18 slips on the imaging surface of the platen 20 when the interim data array is being formed, then the rolled fingerprint image will appear smeared, similar to what happens with the ink and paper method of obtaining a rolled fingerprint image. The smear reduction method of the invention reduces smearing in the rolled fingerprint image by transferring to output memory 54 and display memory 56 only a selected portion of the interim data array 46 with each video frame.

Typically, an operator will preview the finger image prior to entering a capture mode to obtain the rolled fingerprint image. In order to place the finger 20 properly on the platen 18, it is helpful to be able to center the finger while viewing the image of the finger on a display monitor 60. The operator sets Min LUT 48 to the straight-through function and rolls the finger to one side to prepare for the capture of the rolled image. The image displayed is then not a rolled image but a direct image of the finger 18 on the platen 20. Since the capture mode is entered after a scan button is pressed, the data in the image memory 44 at the end of the preview mode serves to initialize that memory for the capture.

Referring now to FIG. 5A, the first frame of optical image signal 42 after capture mode is entered represents an optical image 62a of the surface of the platen 20, including an image of contact area 64a of the finger 18 on platen 20. (The cross-hatching in the drawing indicates fingerprint features.) In FIG. 5B, contact area 64b is to the right of the location of contact area 64a, indicating that the finger 18 has rolled to the right. The contact area 64 continues to move incrementally to the right in FIGS. 5C and 5D. In FIG. 5E, the contact area 64e has shrunk in size from previous contact area 64d, as the finger 18 is lifted from the platen 20.

As the capture mode is entered, the Min LUT 48 is restored to the modified minimum function, as described above. Referring now also to FIG. 6A, the most recent frame of optical image signal 42 that was passed through Min LUT 48 becomes an initial frame of interim data array, which is characteristic of an interim image 66a that includes interim rolled fingerprint image 68a. Interim rolled fingerprint image 68a, in this embodiment, is the same as the corresponding contact area 64a illustrated in FIG. 5A. Alternatively, interim data array can be initialized with all high pixel values, indicative of a blank, illuminated platen (not shown). Min LUT 48 can then update interim data array using the modified minimum function, with a first frame of optical image signal, represented by optical image 62a, as one input and corresponding pixel values of the "blank" interim data array as the other input. The resulting interim data array is essentially the same in either case.

The interim data array is next updated when the second frame of optical image signal 42, represented by optical image 62b in FIG. 5B, is processed through Min LUT 48 with corresponding pixel values 49 of the interim data array, represented by the previous interim image 66a. The updated interim data array is now characteristic of an interim image 66b that includes interim rolled fingerprint image 68b, illustrated in FIG. 6B. Similarly, FIG. 6C illustrates interim image 66c and interim rolled fingerprint image 68c, which are represented by interim data array in image memory 44 after being updated with the next frame of image signal 42, which is represented by optical image 62c, illustrated in FIG. 5C. FIGS. 6D and 6E illustrate respective interim images 66d, 66e and interim rolled fingerprint images 68d, 68e represented by subsequent updates to interim data array.

Contact area detection can be done in many ways. One method is to finely segment the optical image signal 42 and then compute the variance of the data values in each of the segments. A segment with a small variance is considered to have no contact. Another way is to threshold each data value and to consider it contacted when the value drops below a fixed level. This is acceptable when the image background is equalized by Equ LUT 38 since then a fixed level corresponds to a consistent degree of contact across the complete image.

The bottom or tag bit (bit 0) of interim data array in image memory 44 is allocated to the function of indicating contact. Since Min LUT 48 is completely flexible as to what is programmed into it, the function for the tag bit 0 may be handled separately from bits 1–7. The tag bit is set to 1 if the input value to Min LUT 48 from optical image signal 42 is less than a threshold T. The information reflecting the contact area 64 is thus available in the tag bit 0 of the Min DRAM 50 and Catch VRAM 52 as a binary images 70a–70e, which have outlines indicated in FIGS. 6A–6E, respectively, by dashed lines. The accumulated gray-scale interim images 66a–66e are available in the upper bits 1–7 of the Min DRAM 50 and in the Catch VRAM 52 of image memory 44. It will be understood that the processor 30 can determine the binary images 70a–70e even when Min LUT 48 is in preview mode in which the optical image signal is passed through to image memory 44.

The contact area 64 of the fingerprint represented by each frame of optical image signal 42 can be modeled most simply by a contact strip 72, with a left edge 74 and a right edge 76. The contact area 64 usually has a convex perimeter, but we have found it acceptable to consider contact strip 72 to be rectangular-shaped, with the left edge 74 as the column at the left-most edge of the contact area 64 and the right edge 76 as the column at the right-most edge of the contact area 64. The processor 30 determines the right edge 76 and left edge 74 of the contact strip 72 from binary contact image, generally referred to by reference numeral 70, in the Catch VRAM 52. This is done in a time frame comparable to the frame update rate in order to keep up with the rolling finger.

One way to determine the contact strip 72 is to examine one row of tag bits across the center of the binary contact image 70. The left-most tagged pixel is found by searching for the first tagged bit in the row from the left edge of interim data array, and the right-most tagged pixel is found by searching for the first tagged bit in the row from the right edge of interim data array. The left edge 74 and right edge 76 of the contact strip 72 are then identified with the left-most tagged pixel and the right-most tagged pixel.

Dirt or contaminants present on the platen 20 can cause isolated pixels out of the contact area 64 to be tagged in forming the binary contact image 70. The fingerprint is composed of ridges which may align with the line being checked such that a valley will confuse the location of an edge. These problems can be reduced by examining a vertical band 78 that includes a number of horizontal lines near the center of the binary contact image 70. For example, a vertical band 78 of 10 lines spaced 4 lines apart across the middle of the binary contact image 70 can be used.

Using only the left-most tagged pixel as the left edge 74 of the contact strip 72, even when using more than one line near the center of the binary contact image 70, can still be too sensitive to the presence of dirt and falsely indicate contact or distort the finger image at the edges of the contact area 64. To mitigate this problem, in one embodiment, a number of tagged pixels are counted from the left side of the binary contact image 70 before establishing a column as the left edge 74 of the contact strip 72. The processor 30 determines the right edge 76 of the contact strip 72 in a similar procedure. The left and right edges 74, 76 of the contact strip 72 are established as the 10th tagged pixel in from the outside edges.

The processor 30 supports a special mode which allows processing operations to be performed during a two-dimensional block transfer. One of the operations is a logical OR. Thus a number of rows may be transferred to one final row while performing a logical OR. The destination row thus provides an indication of the contact strip over a band 78 instead of a single line.

By identifying the contact strip 72, the processor 30 is able to perform several other new functions. It keeps track of the left edge 74 and right edge 76 of the contact strip 72, and determines when the finger 18 is placed upon the blank platen 20, when the finger 18 is rolled and in what direction, and when the finger 18 is lifted from the platen 20.

When the finger 18 is initially placed on the blank platen 20, the left edge of the finger contacting the platen will be beyond the right edge in a direction from right to left. As the finger 18 is placed down, the contact strip 72 will have a positive width between the right edge 76 and the left edge 74. As long as the left edge 74 of the contact strip 72 keeps going left and the right edge 76 of the contact strip 72 keeps going right, it can be considered that the finger 18 is still in the process of being placed on the platen 20, with the contact strip 72 growing. If the finger 18 is already on the platen 20, the contact strip 72 will start at a positive value. This is the most common situation, when the preview mode is used to place the finger 18 and roll it back to the starting position. The finger 18 usually is not raised again before the capture mode is started.

The processor 30 determines that the rolling of the finger 18 has begun when one edge of the contact strip 72 starts to go inward instead of outward. For example, when the left edge 74 starts to go right, as illustrated in FIGS. 6A–6D, the processor 30 determines that the finger 18 is being rolled right, in which case the right edge 76 is the leading edge and the left edge 74 the trailing edge of the rolling finger. If, instead, the right edge 76 begins to go left, the processor 30 determines that the finger 18 is being rolled left, in which case the left edge 74 is the leading edge and the right edge 76 is the trailing edge of the rolling finger. A small tolerance for jitter is allowed by determining that rolling is begun when the left edge 74 (or right edge 76) of the contact strip 72 moves back from its most extreme position by a small number of pixels, nominally 5. If the left edge 74 is moving right and the right edge 76 moving left for a predetermined number of frames, then the processor 30 determines that the finger 18 is being lifted from the platen 20.

The processor also determines from each frame of image signal 42 a freeze column 80 which corresponds with a position in the contact area 64, or binary image 70, located between the left edge 74 and right edge 76 of the contact strip 72 for each frame. In one embodiment, the freeze column 80 corresponds to a position located approximately half the distance from the trailing edge to the leading edge. In another embodiment, the freeze column corresponds to a position located more than half the distance from the trailing edge to the leading edge.

Instead of transferring the entire interim data array to output memory 54 only after the finger 18 is finished rolling across the image platen 20, as was done with prior art embodiments of the TP-600 device, the porocessor 30 transfers a portion of the interim data array to output memory with each new frame as the finger rolls. The processor 30 ceases to update a portion of a rolled fingerprint image array in output memory 54 behind the freeze column determined from the preceding frame of optical image signal 42. The freeze column 80 moves in increments from frame to frame with the right and left edges 76, 74 of the contact strip 72 in the direction of roll. Since the data in the developing rolled fingerprint image array behind the freeze column 80 is not updated, any image smearing that develops in a trailing portion of the interim image 62 represented by the interim data array does not show up in the rolled fingerprint image array.

Referring now to FIG. 7A, an output rolled fingerprint image array in output memory 52 is initialized with high pixel values indicative of a blank background 82a. Referring now also to FIG. 7B, when the finger 18 starts to roll, the processor 30 updates the output rolled fingerprint image array in output memory 54 by transferring a trailing portion of interim data array from image memory 44. The trailing portion can be, e.g., the trailing portion of interim data array characteristic of interim image 66b, starting with a column corresponding to the trailing edge 74 of the contact strip 72, up to and including the freeze column 80 determined from the current optical image signal. Output rolled fingerprint image array at this point is indicative of rolled fingerprint image 82b, which includes transferred portion image 84b. As the finger 18 rolls, the processor 30 updates the output memory 54 to keep up with the position of the approximate center of the moving contact strip 72.

Each subsequent update to the rolled fingerprint image array in output memory is a portion of interim data array block-transferred from image memory 44. In one embodiment (see FIGS. 8A–8E and related discussion infra), the transferred portion of a current interim data array is characteristic of the interim rolled fingerprint image 68 up to approximately the leading edge, i.e., up to a column of the interim data array corresponding to the leading edge of the current contact strip 72. In another embodiment illustrated in FIG. 7C–7D, the transferred portion of the current interim data array from image memory 44 is narrower, and extends only up to approximately the freeze column 80 of the current optical image signal. FIG. 7C illustrates output rolled fingerprint image 82c, with transferred portion image 84c, after a corresponding portion of the current update of interim data array (see FIG. 6C) is transferred to the output rolled fingerprint image array. The transferred portion of interim data array in this instance includes all data to the right of freeze column 80b, i.e. in the direction of finger roll, up to and including freeze column 80c. Similarly, output rolled fingerprint image 82d, illustrated in FIG. 7D, is represented by the output rolled fingerprint image array subsequent to a portion of a subsequent update and interim data array (see FIG. 6D) being transferred. The transferred portion includes all data to the right of freeze column 80c up to and including freeze column 80d.

For the final update to the rolled fingerprint image array in output memory 54, the transferred portion extends from a column of interim data array corresponding to the freeze column determined from the preceding optical image signal 42 to at least the column of interim data array corresponding to the most extreme position of the leading edge of the contact strip 72. In all cases, the transferred portion of the current interim data array is characteristic of the interim rolled fingerprint image 68 forward from the line represented by the freeze column 80 derived from the preceding optical image signal 42. For example, the final transferred portion, characteristic of transferred portion image 84e illustrated in FIG. 7E, is data interim data array which is characteristic of a portion of interim image 66e forward in the direction of finger roll from the previous freeze column 84d.

Thus, the processor 30 freezes the output memory 54 behind the moving freeze column 80, which is characteristic of a vertical line corresponding to the approximate center of the moving contact strip 72. No updating of the output memory 54 occurs behind that line. While this does not eliminate tip smear, it reduces it by about 50–60%. The smearing in the main part of the fingerprint due to the movement of the back edge of the finger is eliminated. Since smear can still occur between the leading edge and the freeze column 80, the method can be improved by setting the freeze column 80 at a position closer to the leading edge, nominally five-eighths (⅝) of the distance between the trailing and leading edges.

The processor 30 tracks the progress of the leading edge of the contact strip 72, which is the right edge 76 in the embodiment illustrated in FIGS. 5–7. When the leading edge retreats from its farthest position by a selected number of columns as the finger 18 is lifted from the platen 20, the processor 30 determines that the capture is completed, performs the final update to the output memory 54, and ceases to update the rolled fingerprint image array in output memory 54 any further. This prevents smear as the finger 18 is lifted from the platen 20. Thus, when the finger 18 lifts from the platen 20 or rolls backwards, the processor updates the output memory 54 with the forward portion of the interim data array and ceases any further updates.

It is important to note that the processor 30 only passes though a portion of the contents of the image memory 44 to the output memory 54 at any time. This portion corresponds to a narrow strip of the interim data array located adjacent to, but not overlapping with, the freeze column defined by the previously passed through data. It is also worth noting that the data used to update the output memory 54 is not representative of a raw fingerprint image. Rather, the transferred data is representative of the interim rolled fingerprint image 68 produced by the Min LUT 48 in that narrow strip 84 since the finger 18 began to roll.

A rolled fingerprint image is displayed as it is captured. The processor moves data to the display memory (VRAM) 56 from the Catch VRAM 52 in image memory 44. The data is then converted to video format through a digital-to-analog converter (D/A) 58 and output to display monitor 60. In the embodiment depicted in FIG. 4, the display monitor has a display area formed by a 720×720 pixel array. The processor 30 decimates the image by one pixel column out of four and one row out of four during the transfer from the Catch VRAM 52 to the Display VRAM 56 to fit the image into the display format.

Referring now to FIGS. 8A–8E, the processor 30 updates the display memory 56 (in the reduced format described above) from the image memory 44 while the finger 18 rolls on the platen 20 to generate a display rolled fingerprint image array characteristic of a display rolled fingerprint image 86. As the finger 18 is being placed down, i.e. in preview mode, the entire interim data array, characteristic of interim image 66a (which is the same as optical image 62a), is transferred to display VRAM 56 and displayed "live." In FIG. 8A, the live image is image 86a. As discussed above, when the capture mode is entered the data in interim data array representative of the contact strip 72 between the left and right edges 74, 76 of the binary contact image 70 is updated. When the finger begins to roll, a portion of the data in interim data array from Catch VRAM 52, which is representative of the strip behind the current freeze column 80b relative to the direction of finger roll, is transferred to display rolled fingerprint image array. This strip, shown in FIG. 8B as strip image 88b, extends to the far left edge of interim image 66b and is therefore representative of areas of the platen surface that are not contacted by the finger 20. Thereafter, the portions of data from the interim data array representative of a strip of interim image 66 just adjacent to, but not overlapping with the previous freeze column 80b, 80c, respectively, and up to the leading edge 74 of the contact strip 72 are transferred from the Catch VRAM 52 to Display VRAM 56. These strips are illustrated in FIGS. 7C and 7D as strip images 88c and 88d, respectively. This maintains a complete image 86c, 86d, respectively, of the developing rolling fingerprint image in the display rolled fingerprint image array in Display VRAM 56. Referring now also to FIG. 8E, when the capture is deemed complete, the portion of the interim data array representative of the forward strip 88e of the interim image 66e, from the previous freeze column 80d to the far forward edge of the interim data array is transferred to the display VRAM 56. This last update may also include data representative of areas to the far right edge of the platen 20 not contacted by the finger 18. Each update is a portion of interim data array that has been processed by the minimum function 48.

Many variations of the display method can be implemented with corresponding differences in the display quality. For example, whether to update blank areas to the right and left of the contact area, or whether to update from the output image memory or the catch memory, are options that can be traded-off for processing efficiency. Another alternative is not to display anything forward of the current freeze column 80, for example, if the processing time is needed.

After the capture is complete, the operator presses a button to either reject the print or save the print. If the print is saved, the background can be whitened out to present a cleaner image. This is accomplished by comparing the output image with the image remaining on the platen. It is assumed that the operator has lifted the finger before pressing the save button. If a pixel value in the output image is below a corresponding value of a remanent image (i.e. the image of the platen without the finger) by a selected fraction (e.g. approximately 5%), then the pixel is considered contacted and is tagged accordingly. All pixels which are not tagged are whitened to a consistent background level. This eliminates any latent images that might be present in the background or in the voids within the print.

Note that, after each of the image memory 44, output memory 54 and display memory 56 are initialized with data representative of an initial image, there is no place in the system where the optical image signal 42 or portion of the optical image signal is actually stored. All subsequent frames of optical image signal 42 representative of optical fingerprint images from the image system 16 are processed through minimum function 48. It is only a portion of the data in each updated interim data array in image memory 44 that is used to update the output and display memories 54, 56.

In the embodiments described above, Min LUT 48 updates an interim data array in image memory 44 from the existing pixel values of interim data array and corresponding data from a new frame of optical image signal 42 input through the A/D converter 18 and Equ LUT 38. The method only uses the bottom bit of each pixel in image memory 44 to indicate contact. As the finger 20 rolls, the processor updates the output and display memories 54, 56, respectively, with a portion of the interim data array representing a forward portion of the contact strip 72 in the image memory 44. Thus, output and display rolled fingerprint image arrays are respectively formed in output and display memories 54, 56. The rolled fingerprint image arrays are characteristic of a rolled fingerprint image.

In another embodiment, the interim data array may be developed in image memory 44 such that the accumulation of the optical image signal 42 and therefore also the interim data array is stopped behind the freeze column 80. This could be implemented with hardware (not shown), for example with a hardware register (not shown) that stores the information identifying the freeze column 80 and with controls to inhibit storage either right or left of the line, depending on the direction of rolling the finger 18. The processor 30 need only update that freeze column 80 and transfer the interim data array to the output memory 54 when capture is complete.

The function of freezing the updating of the interim image array in image memory 44 can also be implemented as part of the operation of Min LUT 48. For example, one of the address inputs to the Min LUT 48 can be allocated to selecting the data to be frozen in interim data array or to be updated by Min LUT 48. This bit can be controlled by a comparison of the image column with the freeze column 80, which is stored in a register updated by the processor 30.

The smear reduction can be improved by using a more general approach to defining the contact strip, for example determining the contact strip on a row by row basis, but this would take much more processing. The Min LUT 48 could still be used to update the interim data array in image memory 44. The freeze position could be controlled on a line by line basis by storing the freeze column 80 for each line in a memory (not shown) addressed by line number. This memory could be updated by the processor 30 for each field, during the blanking periods of the video or by using dual port techniques. The freeze position for each line is developed from sensing the active range for several lines through the image and then providing a smoothed or interpolated position for the freeze position of the intervening lines.

While the current implementation utilizes an interlaced video input, the invention can also be implemented with a camera that provides a progressive scan, i.e., a scan which outputs only one frame, without any interlacing of lines. This would obviate the need for as much modification of the minimum function.

Since the progress of the roll is being tracked by the processor 30, it is possible to eliminate some of the button pressing by the operator. This is principally achieved by clearing the image memory 44 and restarting capture automatically under certain conditions, depending on the preferred mode of operating the system.

As an example of this method, the operator indicates he wants to save an image by pressing a save button (not shown) or a save foot switch (not shown) after the image capture is deemed complete as in the method described above. To reject the print, the finger is placed back down and rolled again. When the processor detects that the finger is in contact again, the image memory is cleared and the capture restarted. Note that this allows the preview mode to be integrated with the capture mode, provided that the operator lifts and replaces the finger prior to the capture.

The processor 30 can be configured to restart the capture when it determines that the finger 18 changes direction the first time. This corresponds well to the normal operation of placing the finger down to center it, rolling the finger back to one side, then rolling the fingerprint.

The operator assumes that he will roll all the fingers in order. If he wishes to reject a fingerprint, he presses a button. The operation is to keep placing a finger down without rolling until it is centered, then to roll the finger to one side, and then to roll the finger for the capture. This operation can be determined from the states identified for freezing the image—placing the finger down, rolling left or rolling right, lifting the finger. An additional criterion may be placed upon the amount of roll to differentiate between placing the finger and performing a complete capture.

It will be understood by those skilled in the art of electronic fingerprint image capture that the imaging system 16 can be designed in an equivalent embodiment to provide a signal to the A/D converter 36 that indicates fingerprint ridge features by high values and fingerprint valley features by low values. The methods and devices described above would then require only small modifications to accommodate this change.

It will also be understood that although the optical image signal is described above as a data stream, the optical image signal can also be formatted as an array of pixels.

The present invention has been described in terms of preferred embodiments. The invention, however, is not limited to the embodiments depicted and described. Rather, the scope of the invention is defined by the appended claims.

What is claimed is:

1. A method of reducing smear in a rolled fingerprint image represented by a rolled image array, comprising the steps of:

sequentially generating frames of an optical image signal which includes data values characteristic of light intensities of corresponding locations of an optical image, wherein the optical image includes a fingerprint image of a finger rolling on a surface;

determining, for each frame of the optical image signal, a freeze column representing a line positioned between leading and trailing edges of the fingerprint image and oriented transverse to a direction of roll of the rolling finger;

sequentially updating an interim array that is an accumulation of the frames of the optical image signal and characteristic of an interim image of a rolled fingerprint, a current update of the interim array being formed by reducing pixel values of the interim array by a portion of the difference between corresponding data values from a current frame of the optical image signal and the pixel values of the interim array if the corresponding data values of the current frame of the optical image signal are less than the pixel values of the interim array; and generating the rolled image array by transferring portions of the interim array to the rolled image array, wherein the transferred portion of the current update of the interim array extends forward in the direction of finger roll from the freeze column determined from a preceding frame of the optical image signal that preceded the current frame of the optical image signal.

2. The method of claim 1, wherein the transferred portion of the current update of the interim array includes data characteristic of a portion of the interim image up to approximately the leading edge of the rolled fingerprint of the interim image.

3. The method of claim 1, wherein the transferred portion of the current update of the interim array extends up to approximately the freeze column determined from the current frame of the optical image signal.

4. The method of claim 1, wherein the freeze line represented by the freeze column determined from each frame of the optical image signal is positioned at least approximately half a distance in the direction of roll between the leading and trailing edges of the fingerprint image.

5. The method of claim 1, wherein the freeze line represented by the freeze column determined from each frame of the optical image signal is positioned more than half a distance in the direction of roll between the leading and trailing edges of the fingerprint image.

6. The method of claim 1, wherein a first transferred portion of the interim array extends rearward in the direction of finger roll from approximately the freeze column determined from a first frame of the optical image signals.

7. The method of claim 6, wherein the first transferred portion of the interim array is characteristic of a portion of the interim image forward in the direction of roll from about the trailing edge of the first interim image.

8. The method of claim 1, further comprising initializing pixels in the interim array with maximum values.

9. The method of claim 1, further comprising initializing the interim array with data values of a frame of the optical image signal.

10. The method of claim 1, further comprising saving the rolled image array after transferring the portion of a final interim array to the rolled image array.

11. The method of claim 1, further comprising displaying a rolled fingerprint image represented by the rolled image array on a display device as it is generated.

12. The method of claim 11, further comprising decimating the transferred portion such that the rolled image array has fewer pixels than the interim array.

13. The method of claim 1, wherein sequentially updating the interim array includes updating the interim array in real time as frames of the optical image signal are generated, and wherein generating the rolled image array includes transferring a portion of the interim array to the rolled image array in real time as the interim array is updated.

14. The method of claim 1, wherein the transferred portions of the interim array are adjacent and non-overlapping.

15. The method of claim 1, wherein the current update of the interim array $F^n$ is formed according to the relation:

$$F^n = F^{n-1} - K*(F^{n-1} - I^n),$$

where $F^n$ is a pixel value of the current update of interim array, $F^{n-1}$ is the pixel value of interim array, $I^n$ is the corresponding data value of the optical image signal, and K is a factor less than or equal to one.

16. The method of claim 15, wherein K is in a range of 0.25 to 0.5.

17. The method of claim 15, wherein K is approximately 0.33.

18. A method of generating a rolled fingerprint image array characteristic of a rolled fingerprint image, comprising the steps of:

generating a series of frames of an optical image signal characteristic of an optical image of a finger rolling on a surface at sequential times, wherein the frames include data, the value of each datum being characteristic of a light intensity of a corresponding location of the optical image of the rolling finger;

determining a freeze column from each frame, wherein each freeze column is representative of a position between leading and trailing edges of the corresponding optical image of the rolling finger;

sequentially updating an interim array in an image memory with the frames as they are generated, the interim array being characteristic of an interim image of a rolled fingerprint that has a leading edge and a trailing edge, including first updating the interim array by transferring a first one of the optical image signals to the image memory, and then further updating the interim array by reducing pixel values of the interim array with a portion of the difference between corresponding data values of a current frame and the pixel values of the interim array if the corresponding data values of the current frame indicate a darker image than the pixel values of the interim array;

associating the freeze columns determined from the frames with corresponding updates of the interim array; and sequentially updating the rolled fingerprint image array in an output memory with the updates of the interim array by sequentially transferring a portion of each update of the interim array to the output memory, including transferring a portion of the first update of the interim array that extends in a direction of finger roll rearward from approximately the freeze column associated with the first updated interim array, and then transferring a portion of a subsequent update of the interim array that extends forward in the direction of finger roll from approximately the freeze column associated with a preceding update of the interim array.

19. The method of claim 18, wherein the transferred portion for a subsequent update of the interim array extends forward only to the freeze column of the subsequently updated interim array.

20. The method of claim 18, wherein the transferred portions of sequential updates of the interim array are adjacent and non-overlapping.

21. The method of claim 18, wherein the transferred portions of sequential updates of the interim array are adjacent and do not overlap rearward in the direction of finger roll from the freeze column determined from the preceding optical image signal.

22. A device for reducing smear in a rolled fingerprint image represented by a rolled image array, comprising:

an imaging system for sequentially generating frames of a series of electronic signals characteristic of an optical image that includes a fingerprint image of a finger rolling on a surface;

means for sequentially generating frames of an optical image signal in response to the electronic signals, each optical image signal including data, the value of each datum being characteristic of a light intensity of a corresponding location of the optical image;

an image capture system responsive to the optical image signals for sequentially updating an interim array characteristic of an interim image of a rolled fingerprint that has a leading edge and a trailing edge, a current update of the interim array being formed from a preceding update of the interim array and a current frame of the optical image signal by reducing pixel values of the preceding update of the interim array with a portion of the difference between the corresponding data values of the current frame and the pixel values of the preceding update of the interim array if the corresponding data values of the current frame are characteristic of darker images than the pixel values of the preceding update of the interim array;

means for determining, for each frame of the optical image signal, a freeze column representing a line positioned between leading and trailing edges of the fingerprint image and oriented transverse to a direction of roll of the rolling finger; and means for generating the rolled image array by transferring a portion of the current interim array to the rolled image array, wherein the transferred portion of the current interim array extends forward in the direction of finger roll from the freeze column determined from a preceding frame of the optical image signal that preceded the current frame of the optical image signal.

* * * * *